(12) United States Patent
Gummaregula et al.

(10) Patent No.: US 9,223,858 B1
(45) Date of Patent: Dec. 29, 2015

(54) SYSTEM AND METHOD TO DETERMINE QUALITY OF A DOCUMENT SCREENING PROCESS

(75) Inventors: Sirisha Gummaregula, New York, NY (US); Sreekanth Dharmakari, Hyderabad (IN)

(73) Assignee: QuisLex, Inc., New York, NY (US)

( * ) Notice: Subject to any disclaimer, the term of this patent is extended or adjusted under 35 U.S.C. 154(b) by 608 days.

(21) Appl. No.: 12/715,260

(22) Filed: Mar. 1, 2010

Related U.S. Application Data

(60) Provisional application No. 61/156,327, filed on Feb. 27, 2009.

(51) Int. Cl.
G06F 17/30 (2006.01)

(52) U.S. Cl.
CPC .... G06F 17/30719 (2013.01); G06F 17/30011 (2013.01)

(58) Field of Classification Search
None
See application file for complete search history.

(56) References Cited

U.S. PATENT DOCUMENTS

| | | | |
|---|---|---|---|
| 5,642,502 A | 6/1997 | Driscoll | |
| 5,893,092 A | 4/1999 | Driscoll | |
| 6,003,027 A | 12/1999 | Prager | |
| 6,119,114 A | 9/2000 | Smadja | |
| 6,738,764 B2 | 5/2004 | Mao | |
| 6,954,744 B2* | 10/2005 | Shetty et al. | 706/15 |
| 7,130,849 B2 | 10/2006 | Yayoi | |
| 7,844,641 B1* | 11/2010 | Sengupta et al. | G06Q 40/00 707/806 |
| 2002/0138481 A1 | 9/2002 | Aggarwal | |
| 2004/0019616 A1* | 1/2004 | Moffatt | 707/204 |
| 2004/0068495 A1 | 4/2004 | Inaba | |
| 2004/0205051 A1 | 10/2004 | Kim | |
| 2004/0210834 A1* | 10/2004 | Duncan et al. | G06F 17/30011 715/255 |
| 2006/0206455 A1* | 9/2006 | Kronberg | 707/3 |
| 2006/0248073 A1 | 11/2006 | Jones | |
| 2006/0282762 A1* | 12/2006 | Diamond et al. | 715/511 |
| 2007/0226211 A1* | 9/2007 | Heinze et al. | 707/6 |
| 2008/0005101 A1 | 1/2008 | Chandra | |
| 2008/0033929 A1 | 2/2008 | Al-Kofahi | |
| 2008/0154879 A1 | 6/2008 | Lin | |
| 2009/0006383 A1* | 1/2009 | Tunkelang et al. | G06F 17/30424 |
| 2009/0106239 A1* | 4/2009 | Getner et al. | 707/5 |

OTHER PUBLICATIONS

Klufa, J., Dodge-Romig AOQL single sampling plans for inspection by variables, Springer-Verlag, Statistical Papers 38, 111-119 (1997).*

Harman, "Relevance Feedback and Other Query Modification Techniques", Information Retrieval: Data Structures & Algorithms, Jun. 1, 1992, pp. 241-263, ISBN 0-13-463837-9, Prentice-Hall, Inc., Upper Saddle River, NJ, USA.

* cited by examiner

*Primary Examiner* — Neveen Abel Jalil
*Assistant Examiner* — Eddy Cheung
(74) *Attorney, Agent, or Firm* — Ted Sabety, Esq.; Sabety + Associates PLLC

(57) ABSTRACT

Legal document processing (review/summarization/analysis) is a complex and intellectually intensive process. The quality process required for accomplishing this task needs to ensure acceptable levels of accuracy to the customer along with speed and efficiency. Defining of Error Codes, measurement of Error Codes and the related analysis, calibration of results and the analysis of deviations and similarities and the sampling strategy associated with unit selection are critical in ensuring a high acceptable quality level. A system and method of searching through documents in order to find documents relevant to a defined inquiry, whereby the number of irrelevant documents produced and number of relevant documents overlooked is minimized. A system and method of using scoring and quality evaluations for a given search project are described.

11 Claims, 9 Drawing Sheets

4Quadrant$_{QL}$ Process

Quantifying the Opportunities

Associate Calibration

QCer Calibration

Sampling Strategy & Acceptance Criteria

Quality Checking Calibration

Four Quadrant Analysis Diagram

SYSTEM AND METHOD TO DETERMINE QUALITY OF A DOCUMENT SCREENING PROCESS

This nonprovisional patent application claims priority from U.S. Provisional Patent Application No. 61/156,327, filed Feb. 27, 2009, entitled System and Method to Determine Quality of a Document Screening Process which is incorporated herein by reference.

BACKGROUND AND SUMMARY OF THE INVENTION

The field of legal compliance with regulatory law, or even the conduct of litigation requires that teams of lawyers review massive quantities of documents that are stored by corporations and other entities. Similarly, accounting professionals and other professionals often have to sift through massive numbers of documents to find a small subset of documents relevant to the project at hand. Therefore, there is a need for processes that can automate this step. Ideally, a computer would automatically find all relevant documents and property ignore all irrelevant documents. This is accomplished by assembling an alphanumeric query that is then used by the computer to search the documents. However, computers are limited in their ability to review a document and determine its relevance. Typically, the computer is used in combination with human reviewers. This invention relates to how the computer and human reviewer may work as a system or execute a method that results in a determination of relevant documents with a high degree of certainty that none have been improperly excluded or included. Where a reviewer has to determine whether a document should be placed in the selected set, this determination may be erroneous. Therefore, it is advantageous to have automated methods to calculate the relative quality of the selected set that the reviewer has produced.

DETAILED DESCRIPTION OF THE PREFERRED EMBODIMENTS

Figure 1:
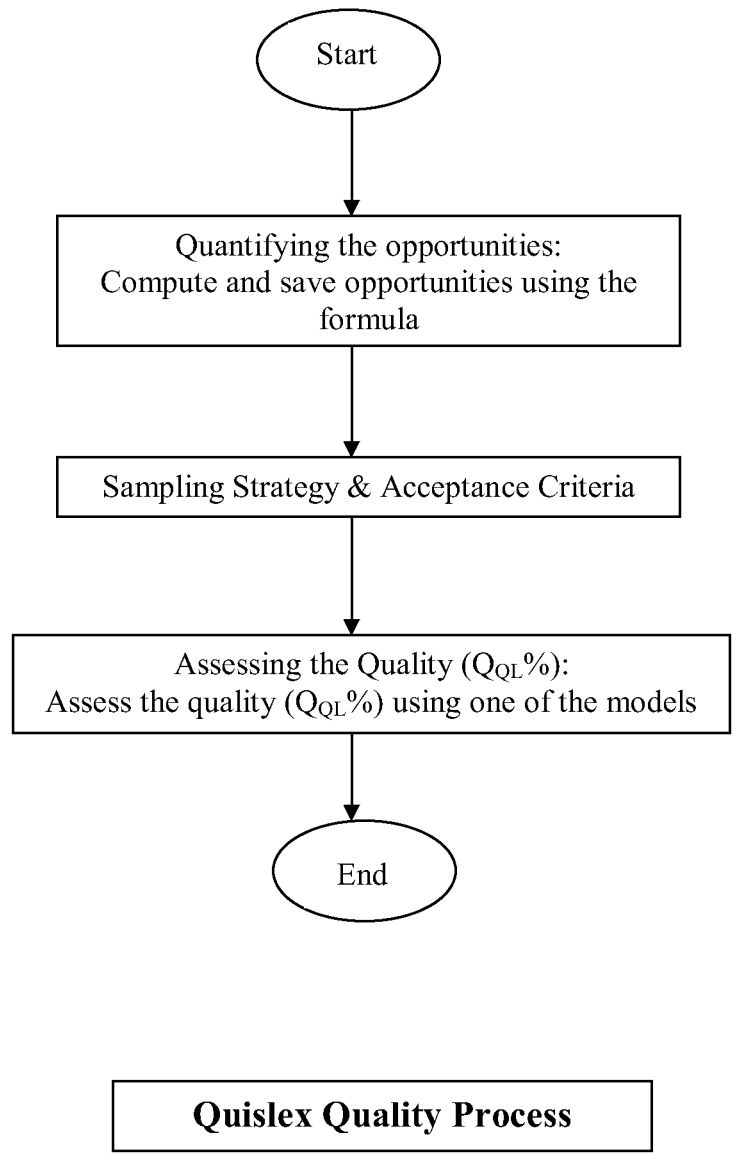
FIG. 1: Process diagram for Quislex Quality Processes

A reviewer in combination with a computer can use a string query (typically a sequence of characters or letters, or a sequence of words) to search electronic documents. Queries can be combinations of letter and numbers, with control characters, wild cards and the like, which are well known in the art. The computer will retrieve documents that meet the query requirements. The result of the query will have some relevant documents and some irrelevant marked as relevant and some relevant documents marked as irrelevant. In other projects, a search is not used, but the reviewer looks at each document and determines whether it is relevant or not to the project. The resulting selected set of documents therefore may contain erroneous included documents or be missing relevant documents. The quality of the result can be calculated and the result of the calculation used to determine how to improve the review process. As shown in FIG. 1, a set of possible errors is defined as the "opportunity" set. A sampling strategy is defined and then an assessment of the review results calculated.

DEFINITIONS

Unit refers to a page, document, family of documents or a batch of documents in this description of the processes.
Associate refers to a person who is a document reviewer.
Issue means the particular subject matter goal of the document review.
Opportunity means a possible error type.
Sampling Level means percentage of documents that are re-checked.

1. Sampling Strategy

The result of a query and review by an Associate is checked for quality. The documents that the associate has delivered as relevant can be considered a set of products subject to quality review. A subset of the delivered documents, i.e. a sample, may be checked for correctness. The next step is determining how many of the delivered documents must be re-checked in order to determine with a high degree of confidence that no documents have been missed.

A sampling may be used either for Quality Check ("QC") purposes or for Document Reduction ("DR") purposes depending on the requirements of each project. In some projects it is possible that sampling may be utilized for both DR and QC purposes. Sampling is also dynamic in that the percentage of units sampled per assignment, per deliverable, per associate (meaning a reviewer), per code, per issue, per grouping or categorization of issues may vary during the life of the project. Some sampling may also be performed after the completion of the project (to permit a defect seepage analysis) which allows a QC team to determine if defects above a minimum acceptable threshold seeped into the delivered work product.

Also, errors feed into determining the Sampling Strategy. Higher numbers or percentages of errors (whether assignment related, issue related or overall) usually lead to higher sampling. The quality objectives of any project (i.e., the quality goal with the associated level of confidence) are also taken into account for determining the percentage of sampling. In general, higher quality goals with a greater degree of confidence require greater sampling. Sampling of the units is done for QC purposes after document review, analysis and/or summarization is performed. In order to determine the sampling level in a structured approach, a Sampling Strategy is defined and customized for each project.

Systematic Sampling is used for all the applicable projects to detect the defective units. Documents or pages are sampled based on the knowledge developed from the already sampled documents. Before starting the sampling activity, sampling levels are determined based on various factors that can cause errors in review, analysis and/or summarization and each factor is assigned multiple levels. In one embodiment, this is encoded in three states: High/Medium/Low. Depending on the factors associated with a unit, sampling level is determined.

Some of the factors that influence the sampling percentage are:
 1. Custodian or Assignment Complexity—High/Medium/Low
 2. Associate Experience—High/Medium/Low
 3. Kappa score of the associate on current or previous assignment—High/Medium/Low 4. Calibration Scores—High/Medium/Low 5. Quality Score—High/Medium/Low In addition, the most recent and relevant historical quality scores of an associate are considered if no QC has been performed yet on the current assignment. If QC was already done on the same assignment, quality score of the current assignment will be considered.

6. Document Mix Where the number of documents tagged as relevant is much higher than expected, a higher sampling rate might be applied. (For example: With respect to a Relevancy Analysis, if the unit has 40% of relevant documents versus an expected 25%, the deviation between the expected and actual will also play a role in increasing/decreasing a sample size.)

7. Homogenous vs. Heterogeneous nature of the underlying units The table below provides a high level example of how some of the above factors affect sampling.

| Complexity | Experience | Quality Score | Expected Sampling |
|---|---|---|---|
| Low | High | High | Low (e.g., 10%) |
| Medium | Medium | Medium | Medium (e.g., 50%) |
| High | Low | Low | High (90%) |

The sampling level for various combinations will be arrived at, in consultation with the project managers, senior execution group and subject matter experts, and will vary from project to project. The sampling level thus arrived will always be more than the sampling % required statistically.

Error Codes, Criticality and Number of Errors

Error codes are defined for a project depending on the internal/external customer requirements. Error codes reflect the possible errors during the review, analysis or summarization of the units. Error codes are drilled down further so as to classify the errors to identify the exact nature of the mistake committed. The purpose of identifying and attaching error codes to a unit not meeting the pre-defined acceptance criteria (which could be pre-specified customer requirement(s)) is two fold:

(i) to identify the type of error(s) committed, and (ii) to identify possible root cause(s) to enable implementation of potential solutions to rectify the error(s).

Some sample error codes:

A relevant document identified as a non-relevant document

A non-relevant document identified as a relevant document

A privileged document not identified as one

A non-privileged document identified as a privileged document

Each occurrence of an error is given a weight depending on the criticality of the error. Criticality is generally based on the severity of error from the customer's point of view.

Step 1: Understanding Requirements

"Error" by definition is "not meeting to the specified requirements." Therefore it is essential to understand the customer requirements both stated as well as implied so that they can be met with little or no deviations. This understanding of requirements in the legal document processing prospective is better known as understanding the "classifications/Issues/Terms/Fields etc. requirements" for which the document review, analysis or summarization is being carried out. To develop a project specific robust quality process, the customer requirements are carefully captured, analyzed, understood and translated to evolve the coding classifications/Issues/Terms/Fields etc.

Step 2: Identification of Error Opportunities or Defects

In the process of meeting the customer requirements during the legal document processing, there is a need to explore the known as well as expected error opportunities which one may come across as a result of not being able to meet the customer requirements. These error opportunities are carefully explored and captured through a process of brainstorming and simulation based on the customer requirements or coding criteria (classifications/Issues/Terms/Fields etc.) Subsequently, the selected few error opportunities are identified so as to meet the customer requirements in an efficient manner. While defining the errors the purpose is to identify possible errors and also to understand, at least preliminarily the possible root cause(s).

Step 3: Criticality Analysis

The identified error opportunities are categorized based on the extent of risk each of them is expected to have in meeting the customer requirements. The error opportunities are classified into multiple categories of criticality (all or a subset, depending on the requirements) In one embodiment, there are three levels:

i. Highly Critical ii. Critical iii. Non-Critical

However, other situations may give rise to more or fewer categories of criticality. In addition, a numeric value of criticality can be associated with each level of criticality.

Step 4: Codification of Errors

Each of the error opportunities subsequent to the criticality or severity analysis is assigned a code. The following notation principle is adopted in this document;

$$EC_i (i=1 \text{ to } n)$$

Where

EC=Error Code n=Number of error opportunities identified i=i th Error Opportunity (i=1 to n)

a) Each issue/term that is reviewed, captured or summarized will have its own level of criticality.

b) Each Error Code is assigned a level of criticality depending on the type of error. In the preferred embodiment, there are three levels: Highly Critical, Critical, Non-Critical etc. However, there may be more or fewer levels or numeric values associated with criticality as the code. In this way, a error code can indicate the type of eeror, and, as a result, its assocaited criticality. When a sample of reviewed documents are checked for accurate determinations, then a database is created where each document has an identifier associated with it, and any errors found in the determination for that document are tracked by inputting the corresponding error code into a computer where a data record associated with that document identifier is stored. In the preferred embodiment, a data structure is stored in computer memory that is comprised of multiple data records, whereby each record corresponds to a document, and the data record's content also include a list of error codes associated with that document. Other information can be included as well, for example, the identity of the associate and the identity of the person performing the QC function.

2 Quality Assessment:

During the QC process QC personnel mark the errors committed in each unit by the previous review associates team. Then the number of errors will be calculated in one or more of the following ways:

1. Total number of errors among all the units

2. Number of units containing at least one error

Number of units containing at least one critical error

Figure 4:
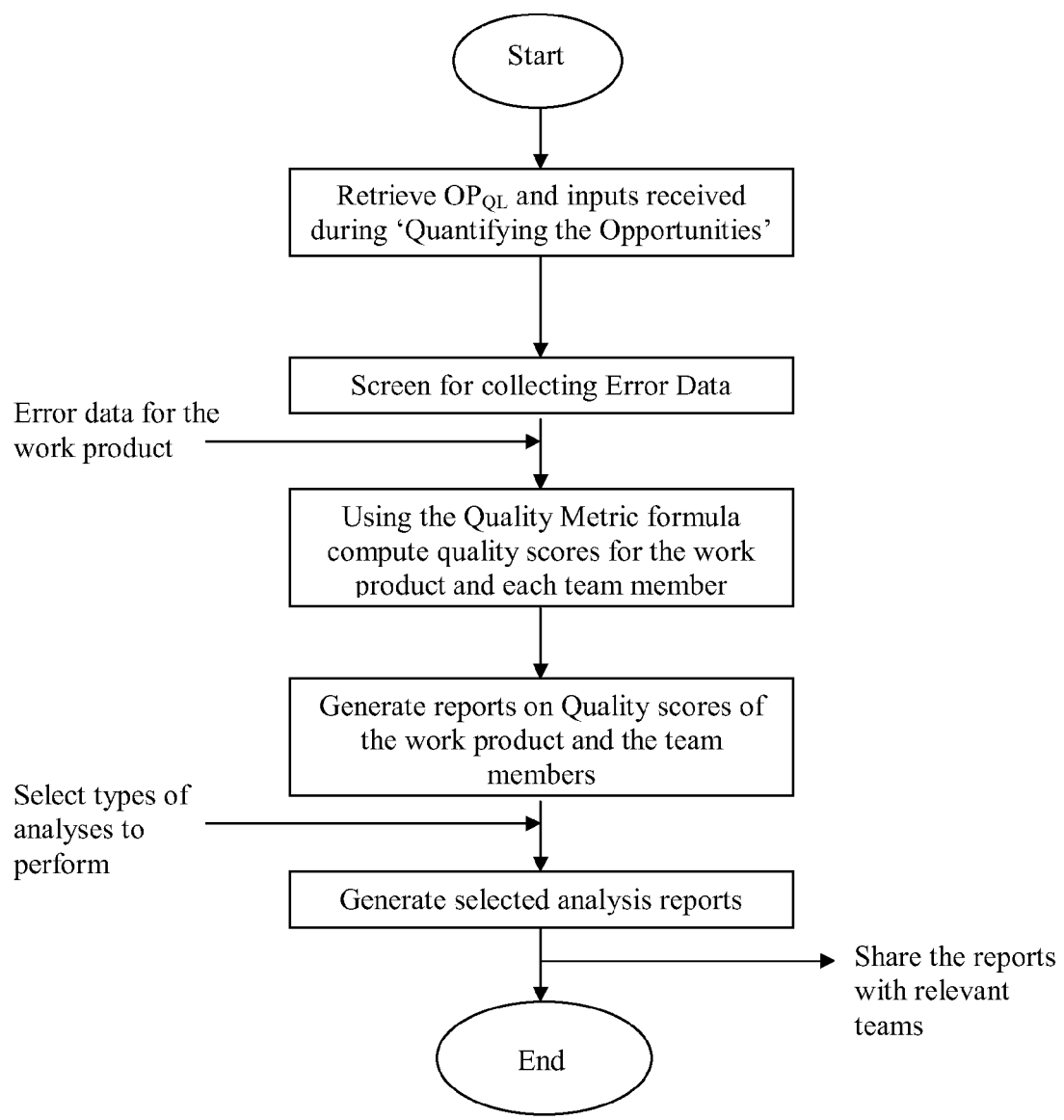
FIG. 4: Process diagram for Assessing the Quality

The number of errors will be adjusted based on the weight assigned to the criticality of each error. A schematic of the assessment process is shown on FIG. 4.

Step 1: Scoping the Assessment

The scope is decided before the quality assessment. The scope includes level of assessment (Associate, team, part-project, attribute specific etc.). The time lines or the production volume is also scoped before using the relevant data for assessment.

Step 2: Quantifying the Opportunities (Opportunity Space)

The opportunities for committing error are quantified considering various aspects of the legal document or other document processing activity. The methodology adopted for arriving at quantifying the opportunities is detailed further below in Section 3.

Step 3: Assessing the Quality (QQL)

The quality (QQL) is calculated in the following manner, using the error code values: The performance of the Associate, Team, Issue, Project etc. is evaluated using pre-defined models. In the preferred embodiment, the model is:

$$Q_{QL}\% = e - \left[ \frac{\sum_{i=1}^{n}(EC_i - w_i)}{OP_{ql}} \right] \times 100$$

Where
$EC_i = I^{th}$ Error Code
$w_i$ = weightage for the $I^{th}$ Error Code (decided based on the criticality of the error)
$OP_{QL}$ = Opportunities
$n$ = Number of error codes involved in the review Other quality models include:

$$Q_{QL}\% = (1 - n_d/N) \times 100$$

Where
$n_d$ = Number of defective units
$N$ = Total number of Units

Or $$Q_{QL}\% = (1 - n_d/N) \times 100$$

Where
$n_d$ = Number of defects (or errors)
$N$ = Total number of Units

3 Determining Number of Opportunities

Opportunity in general is defined as "a possibility due to a favorable combination of circumstances". Due to the complex and dynamic nature of legal document review/summarization/analysis process it is essential to identify the opportunities or the "combination of circumstances" under which there is a greater probability of committing an error.

Number of opportunities to commit an error in a single unit will be arrived at in multiple ways.

- By analyzing all the possible combinations of errors (from the defined list of Error Codes) in a unit, the maximum number of simultaneous errors that can be made in a unit will be treated as the number of opportunities.
- Number of opportunities per unit will be 1, if we look for (i) any error made in the unit (error free units) or (ii) any critical or highly critical error made in the unit.
- Number of opportunities per document can be equal to number of tags, number of terms of summarization or number of fields to summarize.
- Number of opportunities follows the calculation of number of errors, while selecting appropriate option above.
- Number of opportunities is recalculated using the same weights given to errors during the calculation of number of errors.

Quality Metrics—Calculations

Figure 3:
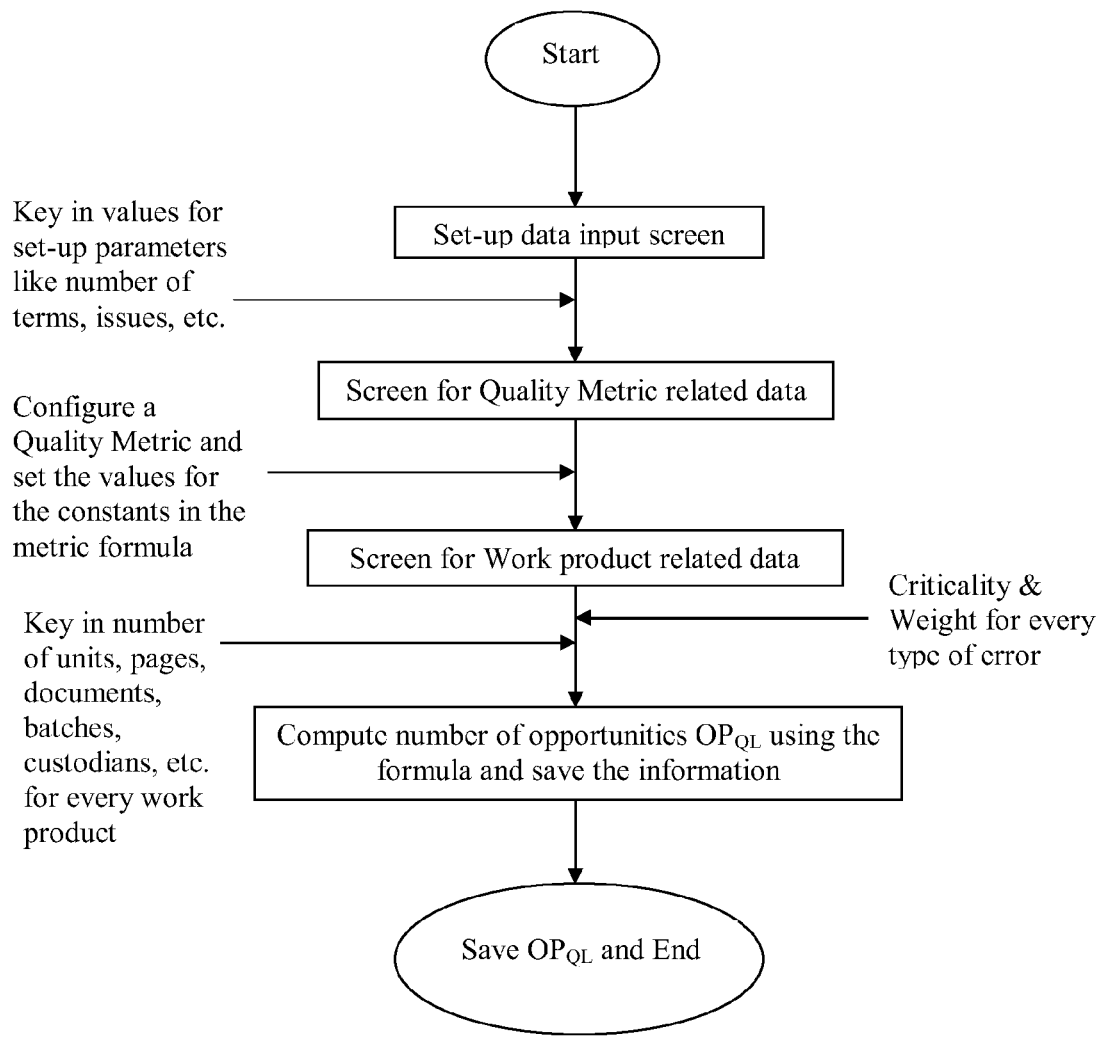
FIG. 3: Process diagram for Quantifying the Opportunities

Quantifying the quality can be done in multiple ways, depending on the need of the end customer (internal/external). The process of quantifying the opportunities is shown in FIG. 3.

The number of opportunities in a given review task is identified with the help of the following model:

$$OP_{QL} = N(1 + k_0 * N_c + k_1 * N_I + k_2 * N_T + k_3 * N_F)$$

Where
$N$ = Number of units/entities (pages/documents/contracts/agreements/assignments/any other form client provided material)
$N$ = Number of classifications (document/error classification)
$k_0$ = Constant (decided based on the criticality on the classification)
$N_I$ = Number of issues (coding issues)
$k_1$ = Constant (decided based on the criticality on the issues)
$N_T$ = Number of Terms (coding/review/summarizing terms)
$k_2$ = Constant (decided based on the criticality on the Terms)
$N_F$ = Number of Fields
$k_3$ = Constant (decided based on the criticality on the Fields)
(The range of k's: 0 to 1)

Generally, the error percentage of the deliverable is calculated first and then the remaining percentage will be treated as the quality percentage of the product. Error percentage is, typically, the ratio of the number of errors to the number of opportunities.

Other examples of quality percentage are:
1. Error %=Total number of errors/total number of units*100
2. Error %=Total number of errors/total number of opportunities*100
3. Error %=Total number of critical errors/total number of critical opportunities*100
4. Error %=Number of units containing at least one error/total number of units*100
5. Error %=Number of units containing at least one critical error/total number of units*100
6. Error %=Number of issues or terms that fall into errors/total number of issues or terms in the unit*100
7. Defects per Unit(DPU)=Total number of errors/number of units
8. Defects per Unit(DPU)=Total Number of critical errors/number of units Quality score is calculated as (100 Error %) OR (e-DPU*100)

4 Calibration

Accuracy is a measure that needs to be consistent with the client's subjective decisions (calls). Since there are no black or white responses for several categorizations the team has to be consistent (i) within the team—to be consistent and so it is easy to make wholesale changes in calls if required, and (ii) with the client. Systematized calibration is something that helps greatly in ensuring this. Calibration involves the team, or the extended team which includes the client, making judgment calls on units under simulated similar conditions. Units for such decision making exaggerate the complexity or the heterogeneous nature of the pool (i.e., the units with the greatest potential for variance in decision making are usually chosen for calibration exercises). The responses are then analyzed to identify outliers and inconsistencies. A further analysis of these and the resultant feedback to the team allows the team to be constantly calibrated within itself and with the client. Major error areas analysis (i.e., which errors account for the greatest percentages of the total errors) are also performed in these calibration exercises. Legal document processing, by virtue of its intellectually intensive activity needs a structured process for calibrating both the i. Associate (Person performing the production work) and
    ii. QCer (Person performing the quality check)

Figure 5:
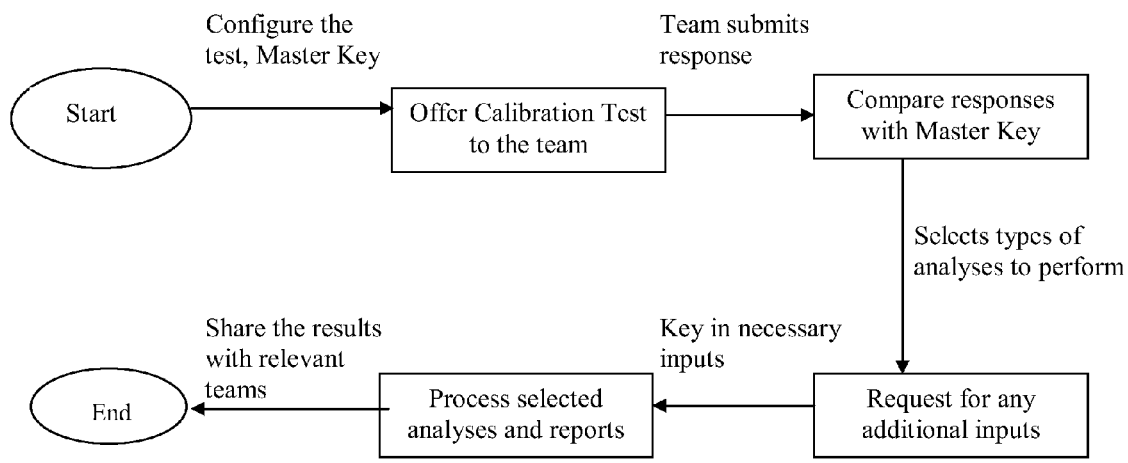
FIG. 5: Process diagram for Associate Calibration
Figure 6:
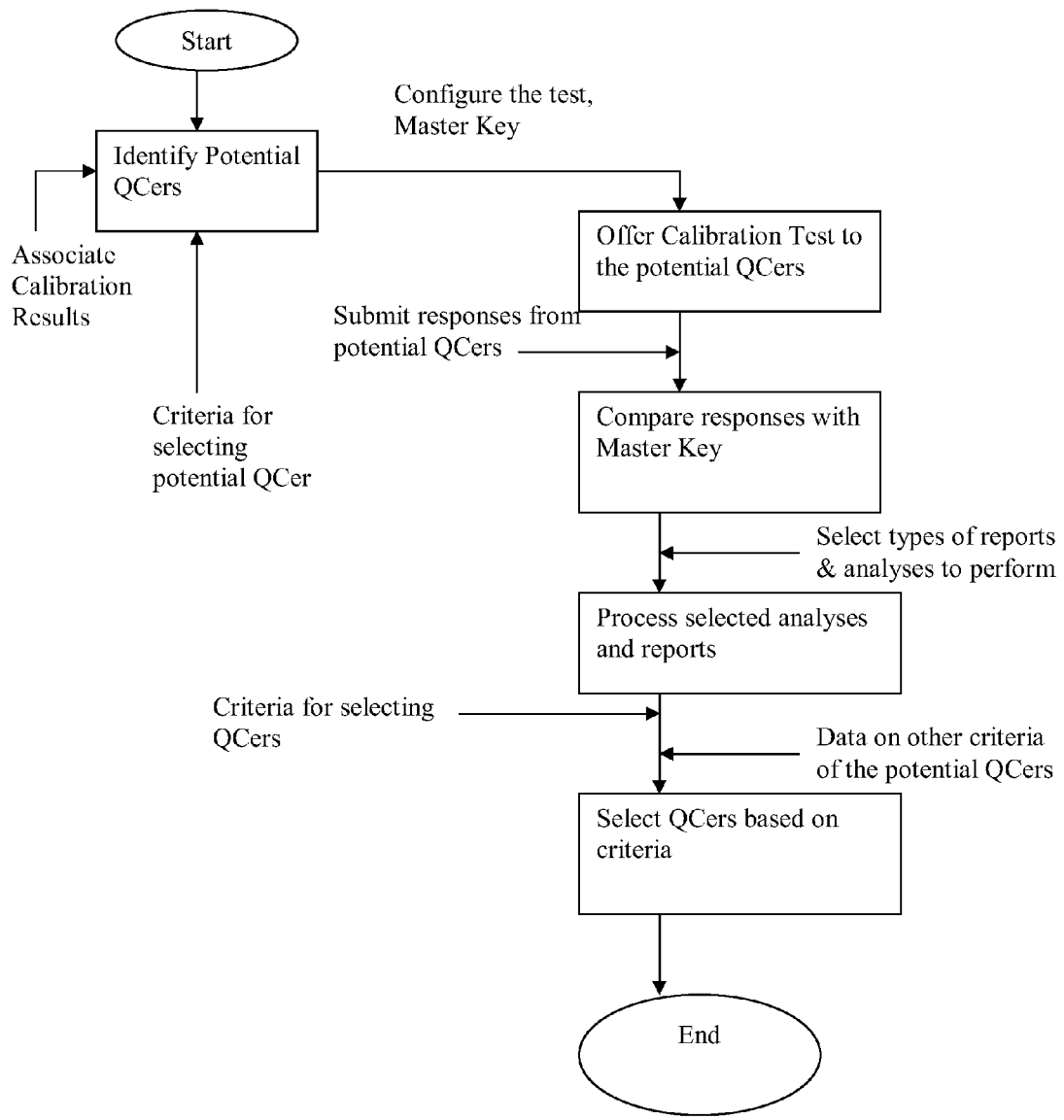
FIG. 6: Process diagram for QCer Calibration

An Associate, in order to execute the legal document processing activity in a quality efficient manner, needs to have a reasonably good understanding of I. Substantive requirements
    II. Classifications/Issues/Terms/Fields etc. of
    III. Any other matter specific or industry specific customer requirements The calibration process involves the following steps shown in FIGS. 5 and 6:

Step 1: Pre-Processing

Associates understanding of the industry, client and specific aspects of the matter are enhanced utilizing various generic and customized training modules. General aspects of relevant techniques (for example the different types of privilege and nuances) are also refreshed.

Step 2: Designing the Calibration Test

Associate calibration exercises are designed to ensure that associates, to the extent possible, are consistent with respect to varying calls/interpretations and their collective interpretation is as close as possible to those of the client. Where there are deviations such deviations are analyzed to better understand reasons for the same and to determine possible course corrective measures. Generally, units chosen for calibration exercises are representative of those that lend themselves to ambiguity or are capable of being interpreted in various ways.

Step 3: Finalizing the Master Key

The key to the calibration test is obtained and finalized in any one of the following manner Wherever possible the master key (True determination) of the units selected for test is obtained from the client directly.
    A master key is prepared internally by a highly experienced associate and sent to the client for validation.

Step 4: Calibration Test

The team takes the test independently (i.e., without any consultation or collaboration).

Step 5: Analysis of Calibration Test Data

The calibration test responses obtained are subjected to statistical analysis (Attribute Agreement Analysis) as per the method provided in the statistical software Minitab™ and the Kappa score corresponding to each Associate is recorded.

ACali
=ith Associate Calibration Score (Kappa Score)

The calibration score of each associate is compared with a benchmarked (standard) score (specific to the individual projects). A root cause analysis is performed in all instances where the associate's score is lesser than the benchmark. Based on the analysis, customized feedback is given to the associate to improve his/her understanding & skills. This is an iterative process in projects of longer duration (i.e, where the projects lend themselves to multiple calibrations).

The measuring system used to check the output of a legal document processing is manual in the form of experienced and skilled legal associates. The complexity associated with this process is to:

I. Understand the substantive aspect
    II. Check whether the associate has performed the right determination or not
    III. Attribute the appropriate error code for the encountered errors.

The skills necessary for performing QC in an effective and efficient manner need to be scientifically calibrated. The calibration exercise need to be so designed to check whether a QCer is successfully meeting the minimum requirements or not.

The calibration process involves the following steps;

Step 1: Identification of the Potential QCers

As the QC activity is a manual process, the identification of potential QCers is a very important activity. The QCers are identified from among the project team with the help of a template.

Step 2: Designing the Calibration Test

A QCer calibration test is designed by identifying such units (documents/contracts) of the project which tries to represent the different substantive aspects of the project. When project specific units are not available, a simulated set of units are used to design the calibration test.

Step 3: Finalizing the Master Key

The key to the calibration test is obtained and finalized in any one of the following manner Wherever possible the master key (True determination) of the units selected for test is obtained from the client directly.
    A master key prepared internally by a highly experienced associate and sent to the client for validation.

Step 4: QCers Calibration Test

The potential QCers identified earlier (Step—1) are subjected to the test designed (step—2) for the specific project and their calibration results are recorded.

Step 5: Analysis of Calibration Test Data

The calibration test responses obtained are subjected to statistical analysis (Attribute Agreement Analysis) as per the method provided in the statistical software Minitab™ and the Kappa scores corresponding to each of the identified potential QCer is recorded.

Step 6: Selection of QCers

The QCer selection is performed by using the following selection model $$QCali = PQCali * PQCi$$

Where
QCali=Final Calibration Score of ith QCer
PQCali=Kappa Score of the ith QCer (potential QCer)
PQCi=ith Potential QCer performance score. (used for identification of QCers)

5. Sampling Strategy (Design & Development of QC Sampling Plans)

It is a well researched fact that sampling inspection is always more efficient than the 100% inspection. This fact is truer when the inspection volume is large and human dominated. Therefore there is a need to adopt an efficient sampling strategy for the Quality Inspection or checking of the output of a legal document processing process.

A completely random sampling is usually not the best suited sampling method to be adopted in this process as the legal documents do not form a homogenous batch or Lot. Therefore a scientific & intelligent sampling method close to the fundamentals of a stratified sampling method is being adopted to come up with a suitable sampling scheme.

Figure 7:
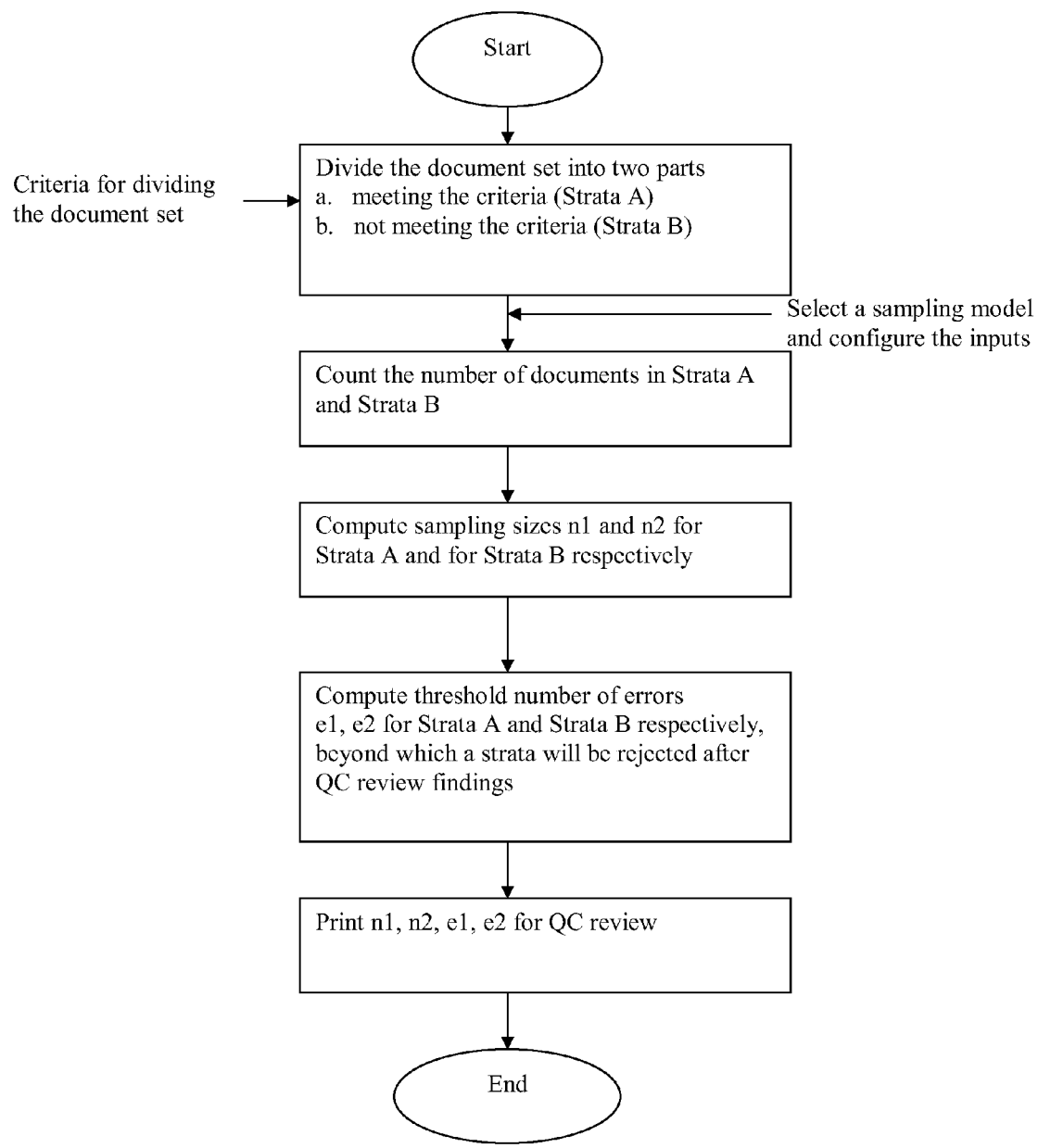
FIG. 7: Process diagram for Sampling Strategy & Acceptance Criteria
Figure 8:
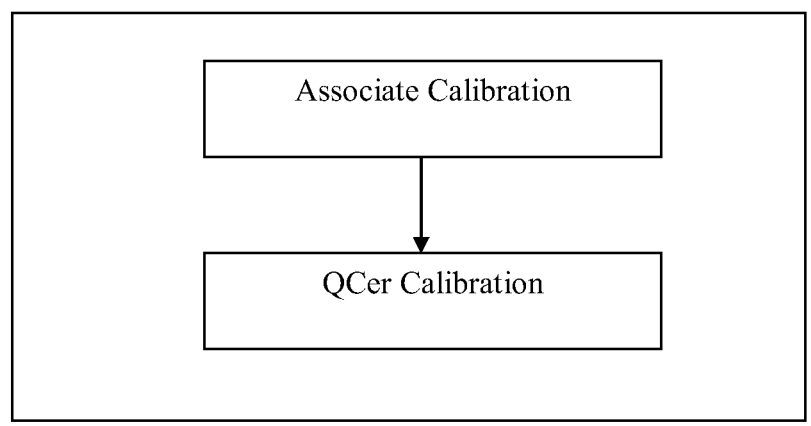
FIG. 8: Process diagram for Quality Checking Calibration

The QC sampling is executed as shown in FIG. 7.

First, there is stratification of the main lot (N) into two sub-lots

Strata A or Sub-lot A: (N1)
    All documents tagged as positive to the requirement of the client (Responsive, Privilege etc) along with all those documents selected using search strings developed exclusively developed for the lot (Batch) designated for QC.

Strata B or Sub-lot B: (N-N1)

All the remaining documents of the main lot or Batch identified for QC other than Strata A or sub-lot A. These documents are tagged as non-specific to the customer requirements (Non-relevant) and not identified as potentially relevant document through the search study as mentioned above.

Sample Sizes: n1 and n2

Where n1=A Simple Random sample selected from the Strata A or Sub-lot A (N1) using an empirical sampling model.

and n2=A Simple Random sample selected from the Strata B or Sub-lot B (N-N1) using an empirical sampling model.

Decision Criteria:

Strata A or Sub-lot A:

All the n1 units undergo QC for all the relevant characteristics under review.

Number of errors or defects observed=e1

If e1=0, the Strata A or Sub-lot A is accepted (N1 units are accepted) if not the Strata is rejected for 100% screening Strata B or Sub-lot B:

All the n2 units undergo QC for the all the relevant characteristics under review.

Number of errors or defects observed=e2

If e2≤d, the Strata B or Sub-lot B is accepted (N-N1 units are accepted) if not the Strata is rejected for 100% screening. The acceptance number d is decided based on the criticality of the project or based on customer requirements.

| Sl. No | Parameter | Weightage | Score ( scale 0 to 1) |
|---|---|---|---|
| 1 | Project Calibration kappa Score | w1 | S1 |
| 2 | Quality in Similar Projects | w2 | S2 |
| | PQC | | = (S1 * w1 + S2 * w2)/(w1 + w2) |

Sampling Plans

The sample size n (n1+n2) for taking a decision on the acceptance/rejection for 100% review/inspection of the Lot is decided using models as outlined below;

| 1 Probabilistic Method | | |
|---|---|---|
| | Strata - A | Strata - B |
| Process Average % | Average Quality | Average Quality |
| LTPD or RQL % | 1%-5% | 1%-5% |
| Producer's Risk % | 5% | 5% |
| Consumer's Risk % | 10% | 10% |
| Sample Size | n1 | n2 |

Average Quality for Strata A & B are decided separately one or more of the following
  i. Quality levels achieved in similar projects
  ii. Quality levels achieved during pre-project processing
  iii. Calibration scores of the associate before starting the production
  iv. Customer requirements
  v. Criticality of the legal document processing carried out in the lot or batch.

LTPD or RQL %, Producer's Risk % and Consumer's Risk % are only indicative and decided based on the customer requirements.

The sample sizes (n1 & n2) are obtained using published sampling plans such as Dodge & Romig Sampling plans or Standard Sampling schemes available on statistical software such as Minitab™.

1 Empirical Model

The empirical sampling plan is developed by taking into account the following attributes of the process 1 Batch (custodian/source etc) Complexity (BC)
2. Associate Experience (AE)
3. Calibration Scores (Kappa score) (CS)
4. Quality Score (QS)

$$n1 = N1 * \{(k1*BC) + k2*(1-AE) + k3*(1-CS) + k4*(1-QS)\}$$

and $$n2 = (N-N1) * \{(j1*BC) + j2*(1-AE) + j3*(1-CS) + j4*(1-QS)\}$$

Where n1=Sample size to be checked in the QC for a specific batch or lot from the strata A
n2=Sample size to be checked in the QC for a specific batch or lot from the strata B
N=lot or Batch size (the lot or batch for QC)
N1=Strata A or Sub-lot A size.
k1, k2, k3 & k4=constants to be associated with the with the process attributes (BC, AE, CS & QS respectively and decided based on the criticality) for Strata-A (the range of k's is between 0 to 1)
j1, j2, j3 &j4=constants to be associated with the with the process attributes (BC, AE, CS & QS respectively and decided based on the criticality) for Strata-B
(Range of j's: 0 to 1)

6. 4QuadrantQL Process

Figure 9:
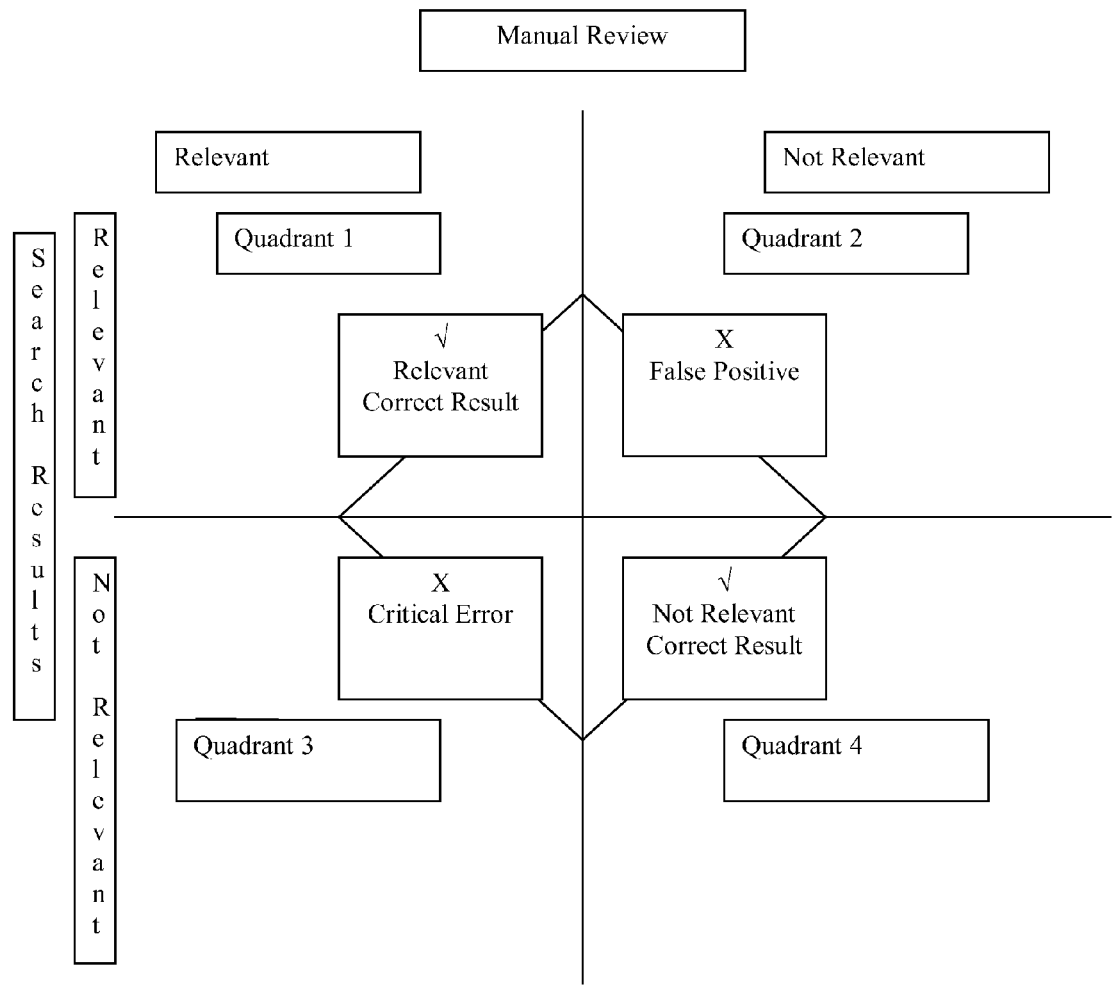
FIG. 9: Four Quadrant Analysis diagram

4QuadrantQL analysis is a process of intelligent review of legal text documents to maximize the review accuracy and to minimize the effort by adopting a scientific reduction and sampling system. In addition to reducing the review effort 4QuadrantQL significantly improves the quality as a result of focused review of only a part of the document set mostly containing the relevant documents (Responsive, Privileged or any other). The methodology also enables intelligent allocation of priority relevant documents (critical) to experienced legal associates for higher efficiency and quality. A schematic of how documents fall into one of four categories, is shown in FIG. 9.

Figure 2:
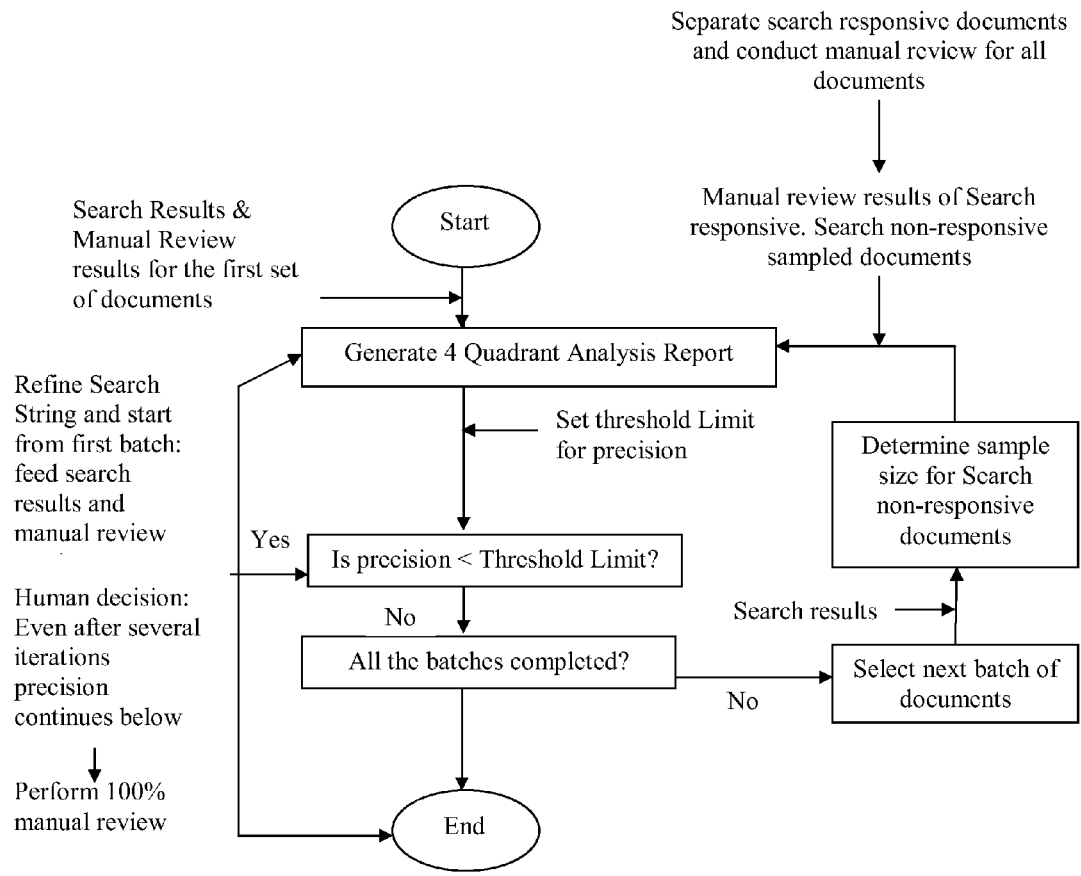
FIG. 2: 4Quadrant$_{QL}$ Process

The 4 Quadrant analysis is shown on FIG. 2 and one embodiment describe below:

Step 1: Conceptualizing the 4QuadrantQL

Understanding & analyzing the review requirements to conceptualize the scope & structure of the 4QuadrantQL design. The understanding encompasses understanding the case in hand, its complexity and substantive aspects to effectively arriving at the key terms for building the search string.

Step 2: Developing the Search String

Through an extensive research and brainstorming all possible search terms are identified for building an efficient search string. These terms are evaluated individually as well as in groups (clusters) to finally build the prototype string meant for validation & refinement.

Step 3: Building the 4QuadrantQL.

The 4QuadrantQL is built by initially identifying a subset (Training Set) of the total documents meant for review. The quantum of the training set is decided based on the complexity & technicality of the review but with a maximum limit of (usually 20%) the total documents. The subset of documents is selected in any one of the following manner a. Initial batch of documents provided by the client.
b. Completely random when there is a prior knowledge about the homogeneity in the content of the documents.
c. Stratifying the documents and selecting from each strata in a random way.
d. Any other method that meets the requirement of representativeness.

The documents belonging to the subset are 100% reviewed for identification of the relevant and not relevant documents by associates. Pilot run of the search string is executed on this known set of pre reviewed documents, resulting in creation of the 4QuadrantQL. This is shown in the 4 quadrant diagram, in FIG. 9.

Step 4: Analysis of the 4QuadrantQL Data
Number of documents in the Training Set=N
The accuracy and precision of the 4QuadrantQL search string is studied with the help of data on the number of documents in each of the Quadrant subsequent to the 4QuadrantQL analysis on the training set. The study is exemplified by the following table:

| | | Manual Review Results: | | |
|---|---|---|---|---|
| | | Relevant | Not Relevant | Total |
| Search String Results | Relevant | Nr | Np − Nr | Np |
| | Not Relevant | Na − Nr | N − Na − Np + Nr | N − Np |
| | Total | Na | N − Na | N |

4QuadrantQL Metrics
Accuracy of the 4QuadrantQL search string=Nr/Na
Proportion of missing relevant documents (Error) (p)=1−(Nr/Na)
Precision of the 4QuadrantQL search string=Nr/Np
Proportion of documents wrongly identified as =(Np−Nr)/(N−Na) relevant documents Step 5: Refining & Optimizing the Search String & 4Quadrant.

Root Cause Analysis

The accuracy of the search string is refined & improved with the help of structured root cause analysis. The objective at each stage of this optimization process is to improve the accuracy of the 4QuadrantQL search string while minimizing the proportion of false positive (wrongly identified as relevant). 100% manual review of the documents which were missed by the 4QuadrantQL search string (Documents in Q3) as well as the documents wrongly identified as the relevant documents (Documents in Q2) is conducted. This focused review helps in identification of the root causes (key terms, concepts etc.) that need to be included/excluded from the 4QuadrantQL search string to make it more efficient.

Validation

In the process of optimizing the 4QuadrantQL search string the results (before improvement & after improvement) are validated statistically. Usually, the 4QuadrantQL search string is developed in such a manner that it ensures a minimum of 0.95 accuracy or keeping the error (p) below 0.05.

The methodology for validation is explained in further below.

Step 6: Developing the Review & Sampling Strategy

After the pilot run on the subsets, the remaining documents are divided into multiple batches of documents for ease of operation and to obtain better results as the learnings from each batch can be incorporated going further. Any logical division will be fine; however this step is not mandatory. Each batch of documents is subjected to intelligent review using the optimized search string and the Quadrants so generated.

Using the search string, the document set is divided into two parts—Search Relevant and Search Non-relevant. Search Relevant is subjected to 100% review for reconfirming the relevancy of the documents which results in segregation of the documents into 1st Quadrant and 2nd Quadrant which constitute truly relevant and false positive documents respectively. The set of Search Non-relevant documents is subjected to a sampling review with a sampling plan designed and developed based on the 4QuadrantQL analysis and other review specific aspects.

Step 7: Document Review & Continual Improvement

The refined search string thus formed can be employed on the remaining batches or on all the batches including already processed batches depending on necessity. As a result of the intelligent review the productivity & quality is increased significantly. The 4QuadrantQL process results in focused review of the potentially relevant documents rather than diverting the effort equally on all the documents which normally includes a large number of non-relevant documents. The process further facilitates allocation of relevant & priority documents to senior associates as a part of efficient production scheduling & allocation.

4QuadrantQL search string validation:
$p_{Bi}$=Proportion of relevant documents missed (before improving study on the search string)
$p_{Ai}$=Proportion of relevant documents missed (after improvement study on the search string)
Ho (Null Hypothesis) $(p_{Ai}-p_{Bi})=0$
H1 (Alternate Hypothesis) $(p_{Ai}-p_{Bi})\neq 0$
Test Statistic (z–Statistic):

$$z = \frac{(p_{ai} - p_{bi})}{\sqrt{p(1-p)\left[\frac{1}{N_1} + \frac{1}{N_2}\right]}}$$

Where p (pooled estimate of proportion)

$$P = \frac{N_1 P_{AI} + N_2 P_{Bi}}{N_1 + N_2}$$

N1=Number of total documents in the trial (training) set (Before Improvement study)
N2=Number of total documents in the trial (training) set (After Improvement study)
The z statistic is tested for the critical value
±1.96 for α=0.05 (5%) when the desired confidence is 95%
±2.58 for α=0.01 (1%) when the desired confidence is 99%
The above test for validation is executed manually or using a standard statistical software such as Minitab™.

The Sampling Method

Following sampling method is adopted for deciding the sample size needed for reviewing the potentially non-relevant documents identified by the 4QuadrantQL search string and confirm that all such documents are truly non-relevant.

Notations & definitions for the documents involved in the pilot run
1. Number of Documents: N
2. Number of relevant documents based on manual review: Na
3. Number of Potentially relevant documents identified by the 4QuadrantQL string: Np
4. Number of relevant documents out of the potentially relevant docs (Q1): Nr 5. Accuracy of the 4QuadrantQL string: Nr/Na
6. Proportion of missing relevant documents (Error) (p): 1−(Nr/Na)
7. Upper confidence limit for p [p+$Z_\alpha$/2 sqrt(p(1−p)]: pu ($\alpha$=0.05 or 0.01)

Notations & definitions for the batches after the pilot run

8. Number of documents in the batch: Npn

Number of documents identified as potentially Non-relevant when the 4QuadrantQL string is run on a selected batch of documents meant for review.

9. Document complexity: Dc

The complexity of the review is estimated based on factors that have potential to influence review accuracy such as industry type, document type, concept, content, technology etc. It is estimated on a scale of 0 to 1 using an organizational evaluation template. (Template—A)

10. Review Efficiency: Re

A prior estimate is made on the efficiency of review by the team based on the available substantive knowledge, skills, experience etc. It is estimated on a scale of 0 to 1 using an organizational evaluation template. (Template—B)

Sampling plan for manual review of potentially non-relevant documents identified by the 4QuadrantQL search string The sample size is decided by any one of the methods are described below. (Higher sample size is preferred)

i Empirical Method:
Sample Size (Simple random sample selected from Npn)

$$n=[Npn*pu*(1+Dc*k1+(1-Re)*k2)]$$

Where k1 and k2 (between 0 to 1) are constants decided based on the document/review criticality ii. Probabilistic Method 1:
Sample Size (Simple random sample selected from Npn using Dodge & Romig Sampling plan tables or sampling plan tables available in statistical software such as Minitab™)
AQL (Process Average)=pu
LTPD (Lot Tolerance percentage defective)=1 to 5% (or based on customer requirement)
Consumer & Producer Risks (percentage)=5% and 10% (or based on customer requirement)

iii. Probabilistic Method 2:
Z score of the Confidence Level from standard normal probability distribution=z
Accuracy of the 4QuadrantQL string q=Nr/Na
Acceptable error (in proportion, not percentage)=e
Sample Size (Simple random sample selected from Npn), $$n=z2*q*(1\times q)*Npn/(Npn*e2+z2*q*(1-q))$$

The sampled documents are reviewed for identifying presence of any relevant documents.

Decision Criteria: Acceptance number (c)=0 (No relevant document found in the sample) If a single document is identified as relevant document in the sample (n) then the remaining documents (Npn−n) is subjected to greater sampling (sometimes 100%).

Evaluation Templates
1. Document complexity: $D_c$ (Template - A)

| Sl. No | Parameter | Weightage | Score (scale 0 to 1) |
|---|---|---|---|
| 1 | Industry Type & Technology | W1 | S1 |
| 2 | Subject Matter for Review | W2 | S2 |
| 3 | Type & Format of Documents | W3 | S3 |
| 4 | Custodians Profile | W4 | S3 |
| | $D_c$ | | = (S1 * w1 + S2 * w2 + S3 * w3 + S4 * w4)/ (w1 + w2 + w3 + w4) |

2. Review Efficiency: $R_e$ (Template B)

| Sl. No | Parameter | Weightage | Score (scale 0 to 1) |
|---|---|---|---|
| 1 | Overall Experience | W1 | S1 |
| 2 | Experience in Similar Projects | W2 | S2 |
| 3 | Prior Quality | W3 | S3 |
| 4 | Skill & Analytical Ability | W4 | S4 |
| | $R_e$ | | = (S1 * w1 + S2 * w2 + S3 * w3 + S4 * w4)/ (w1 + w2 + w3 + w4) |

Searches

Searches are carried out in litigation projects mostly. Litigation projects (document reviews) are typically conducted utilizing litigation tools or software most of which are commercially available. Most commercial litigation tools generally have some form of search functionality. Such search capabilities include for example, Boolean logic, individual key words, combination of key words, proximity searches, root expander options, tags etc. The QC team typically builds highly complicated searches that are customized for project requirements and that build on prior experience and generic search strings used in prior projects. Client specific search strings that grow progressively (with each litigation) for the client as well as industry specific search strings both of which are proprietarily developed by the QC team may be utilized.

Searches are used for various purposes as mentioned below:

1. Hot/Relevancy Search: Keywords that indicate relevancy are identified and grouped together for various combinations so as to reduce false hits. All the docs resulted through the search are tagged for "Potentially Relevant" or "Potentially Hot". This tag will help the reviewers to have a careful look at the document.
2. Potentially Privileged docs: Docs containing any of the key words that indicate content for being privileged are found using various search features offered by the software. Keywords are identified based on case specific matter, general Privilege terminology, general/case-specific list of attorneys involved, general/case-specific law firms and from the QC team's prior experience on multiple projects with the client or otherwise.
3. Incompatible tags: To identify the documents with incompatible tags. E.g., if a document is tagged "Not Relevant" and "Relevant" it is an obvious error since this can not happen. These types of erroneously tagged documents can be easily filtered out and be subjected to another round of review.

4. Incompatible QC Tags: To identify the documents with Error Codes but did not undergo correction in the issue tags. AND, to identify the documents with changes in issue tags but with no Error Codes.
5. Rare combination of tags: Searches can be useful to identify rarely possible combination of tags for a given document. All such documents will undergo another review to avoid any errors in the tagging. For example, Documents with "Foreign Language" tag can be tagged as Relevant/Not Relevant in some cases.
6. Inconsistent Family Tagging: Among the family of documents, if all the docs need to be tagged uniformly, searches can find the document sets with inconsistent family tagging.
7. Potential Errors: Documents identified as potentially Hot/Relevant/Privileged via the searches mentioned above may be tagged otherwise and it could be correct. However, the QC team finds all such documents using search options and reviews all of them. This is to minimize possible errors and to further refine the search strings.

Hot/Relevancy and Potentially Privileged Searches are run before the review takes place. All other searches are can be run after the review is done to identify any erratic tagging possibilities. The searches are saved for future use and typically used with further customizations for the same client or for other clients in similar industries or litigations (subject to confidentiality).

The typical computer is comprised of a central processing unit, a main memory, a mass storage device and input and output connections. The input and output include keyboards, monitors and network connections. The mass storage device can be a magnetic disk, optical disk or a large array of semiconductor devices. The main memory is typically an array of semiconductor circuits. The central processing unit is operatively connected to these components so that it can both control their activities and move data among the components. The central processing unit can load data off of the mass storage device and write it into main memory. This data can either be treated as a program or as data to be processed. If a program, the central processing unit passes control to the program data and executes the instructions encoded in the data. Program data can be an application servicing the user.

A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. Practitioners of ordinary skill will recognize that functions that are accomplished on one server may be partitioned and accomplished on multiple servers that are operatively connected by a computer network by means of appropriate inter process communication. In addition, the access of the website can be by means of an Internet browser accessing a secure or public page or by means of a client program running on a local computer that is connected over a computer network to the server. A data message and data upload or download can be delivered over the Internet using typical protocols, including TCP/IP, HTTP, SMTP, RPC, FTP or other kinds of data communication protocols that permit processes running on two remote computers to exchange information by means of digital network communication. As a result a data message can be a data packet transmitted from or received by a computer containing a destination network address, a destination process or application identifier, and data values that can be parsed at the destination computer located at the destination network address by the destination application in order that the relevant data values are extracted and used by the destination application.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The method described herein can be executed on a computer system, generally comprised of a central processing unit (CPU) that is operatively connected to a memory device, data input and output circuitry (10) and computer data network communication circuitry. Computer code executed by the CPU can take data received by the data communication circuitry and store it in the memory device. In addition, the CPU can take data from the I/O circuitry and store it in the memory device. Further, the CPU can take data from a memory device and output it through the JO circuitry or the data communication circuitry. The data stored in memory may be further recalled from the memory device, further processed or modified by the CPU in the manner described herein and restored in the same memory device or a different memory device operatively connected to the CPU including by means of the data network circuitry. The memory device can be any kind of data storage circuit or magnetic storage or optical device, including a hard disk, optical disk or solid state memory.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as FORTRAN, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Practitioners of ordinary skill will recognize that the invention may be executed on one or more computer processors that are linked using a data network, including, for example, the Internet. In another embodiment, different steps of the process can be executed by one or more computers and storage devices geographically separated by connected by a data network in a manner so that they operate together to execute the process steps. In one embodiment, a user's computer can run an application that causes the user's computer to transmit a stream of one or more data packets across a data network to a second computer, referred to here as a server. The server, in turn, may be connected to one or more mass data storage devices where the database is stored. The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the Appendices is intended only to provide an extremely detailed disclosure of the present invention and is not intended to be limiting. It is appreciated that any of the software components of the present invention may, if desired, be implemented in ROM (read-only memory) form. The software components may, generally, be implemented in hardware, if desired, using conventional techniques.

The foregoing description discloses only exemplary embodiments of the invention. Modifications of the above disclosed apparatus and methods which fall within the scope of the invention will be readily apparent to those of ordinary skill in the art.

Accordingly, while the present invention has been disclosed in connection with exemplary embodiments thereof, it should be understood that other embodiments may fall within the spirit and scope of the invention, as defined by the following claims.

What is claimed:

1. A method of determining the quality of a selected set of documents resulting from a document review process, said method executed by a computer system comprised of at least one processor connected by a data network to at least one data storage device, comprising:

receiving data representing the selection of a set of documents from a document review process into a first and a second subsets, where the first subset of documents is associated with a first criteria indicator data value indicating that the document meets a predetermined document selection criteria and the second subset associated with a second criteria indicator data value indicating that it does not meet the predetermined document selection criteria;

storing in a computer memory a first and a second predetermined statistical sampling rates, each sampling rate corresponding to the first and second subsets, said statistical sampling rates being values representing a statistical frequency of checking the accuracy of the respective first and second subset selection where the first and second rates are determined by a sampling model;

determining using the computer system for the first and the second subset a corresponding first and second sample set of selected documents using the corresponding first and second sampling rate;

for each document in the first and second sample set of selected documents, receiving data representing a determination whether the associated criteria indicator is erroneous and a corresponding error type and storing in computer memory a data value representing the corresponding error type;

determining using the computer system for the first and second sample sets, a corresponding first and second error rate;

in dependence on the first error rate being equal to zero, storing in computer memory for each document in the first subset a data value representing that the document is correct and in dependence on the first error rate being greater than zero storing in computer memory a data value representing the logical condition that the entire first subset is rejected;

in dependence on the error rate corresponding to the second sample set being equal to or less than a predetermined threshold value, storing in computer memory for each document in the second subset a data value representing that the document is correct and in dependence on the second error rate being greater than the predetermined threshold value, storing in computer memory a data value representing the logical condition that the entire second subset is rejected; and generating a data structure representing a report on the quality of the selection of the set of documents into the first and second subsets.

2. The method of claim 1 where the error type corresponds to the condition that a relevant document is identified as a non-relevant document.

3. The method of claim 1 where the error type corresponds to the condition that a non-relevant document is identified as a relevant document.

4. The method of claim 1 where the error type corresponds to the condition that a privileged document is identified as a non-privileged document.

5. The method of claim 1 where the error type corresponds to the condition that a non-privileged document is identified as a privileged document.

6. The method of claim 1 where there are four error types corresponding to the four conditions that a relevant document is identified as a non-relevant document, a non-relevant document is identified as a relevant document, a privileged document is identified as a non-privileged document and a non-privileged document is identified as a privileged document.

7. The method of claim 1 where the sampling model is an empirical model using data parameters representing at least one of document complexity, reviewer experience, calibration scores or result quality scores.

8. The method of claim 1 where the sampling model is based on the Dodge and Romig sampling plan tables.

9. The method of claim 1 where the predetermined document selection criteria is the condition that a document contains a predetermined text string.

10. A system comprised of computers adapted to perform the method of:

receiving data representing the selection of a set of documents from a document review process into a first and a second subsets, where the first subset of documents is associated with a first criteria indicator data value indicating that the document meets a predetermined document selection criteria and the second subset associated with a second criteria indicator data value indicating that it does not meet the predetermined document selection criteria;

storing in a computer a first and a second pre-determined statistical sampling rates, each sampling rate corresponding to the first and second subsets, said statistical sampling rates being values representing a statistical frequency of checking the accuracy of the respective first and second subset selection where the first and second rates are determined by a sampling model;

determining using the computer system for the first and the second subset a corresponding first and second sample set of selected documents using the corresponding first and second sampling rate;

for each document in the first and second sample set of selected documents, receiving data representing a determination whether the associated criteria indicator is erroneous and a corresponding error type and storing in computer memory a data value representing the corresponding error type;

determining using the computer system for the first and second sample sets, a corresponding first and second error rate;

in dependence on the first error rate being equal to zero, storing in computer memory for each document in the first subset a data value representing that the document is correct and in dependence on the first error rate being greater than zero storing in computer memory a data value representing the logical condition that the entire first subset is rejected;

in dependence on the error rate corresponding to the second sample set being equal to or less than a predetermined threshold value, storing in computer memory for each document in the second subset a data value representing that the document is correct and in dependence on the second error rate being greater than the predetermined threshold value, storing in computer memory a data value representing the logical condition that the entire second subset is rejected; and generating a data structure representing a report on the quality of the selection of the set of documents into the first and second subsets.

11. The system of claim 10 further adapted to use are four error types corresponding to the four possible determinations that a relevant document is identified as a non-relevant document, a non-relevant document is identified as a relevant document, a privileged document is identified as a non-privileged document and a non-privileged document is identified as a privileged document.

* * * * *